United States Patent
Akkermans et al.

(10) Patent No.: US 11,898,933 B2
(45) Date of Patent: Feb. 13, 2024

(54) TEST KIT FOR EXECUTING A SEQUENCE OF INDIVIDUAL CYLINDER TESTS

(71) Applicant: DAF Trucks N.V., Eindhoven (NL)

(72) Inventors: Luc Henricus Maria Akkermans, Leende (NL); Remco Streefkerk, Mierlo (NL)

(73) Assignee: DAF Trucks N.V., Eindhoven (NL)

( * ) Notice: Subject to any disclaimer, the term of this patent is extended or adjusted under 35 U.S.C. 154(b) by 0 days.

(21) Appl. No.: 17/824,001

(22) Filed: May 25, 2022

(65) Prior Publication Data
US 2022/0381648 A1    Dec. 1, 2022

(30) Foreign Application Priority Data
May 26, 2021   (NL) ...................................... 2028289

(51) Int. Cl.
*G01M 15/05*    (2006.01)
(52) U.S. Cl.
CPC .................................. *G01M 15/05* (2013.01)
(58) Field of Classification Search
CPC ..................................................... G01M 15/05
See application file for complete search history.

(56) References Cited

U.S. PATENT DOCUMENTS

| | | |
|---|---|---|
| 3,994,160 A | 11/1976 | Hanson |
| 6,002,980 A | 12/1999 | Taylor et al. |
| 6,185,996 B1 | 2/2001 | He et al. |
| 2010/0031738 A1 | 2/2010 | Feldkamp et al. |
| 2018/0052077 A1 | 2/2018 | Adachi et al. |
| 2019/0339164 A1 | 11/2019 | Kupiec et al. |
| 2020/0191075 A1* | 6/2020 | Szczepanski ........... F02D 13/06 |

OTHER PUBLICATIONS

Dutch Search Report and Written Opinion—App No. 2028289—dated Feb. 9, 2022.

* cited by examiner

*Primary Examiner* — Eric S. McCall
(74) *Attorney, Agent, or Firm* — Banner & Witcoff, Ltd.

(57) ABSTRACT

A test kit is disclosed for testing an internal combustion engine with the engine kept at a fixed load condition. The test kit includes a test module programmed to execute a sequence of individual cylinder tests by measuring, in each cylinder test, a first engine performance value and providing an amount of fuel to one cylinder under test to differ from an amount of fuel provided to the rest of the plurality of cylinders. A further test module is programmed to measure, in an idle period between subsequent individual cylinder tests of the sequence of individual cylinder tests, a second engine performance value. This further test module is programmed to discard at least some of the individual cylinder tests if the second engine performance value measured by the further test module passes a threshold.

12 Claims, 4 Drawing Sheets

FIG. 2, Cont'd

TEST KIT FOR EXECUTING A SEQUENCE OF INDIVIDUAL CYLINDER TESTS

CROSS-REFERENCE TO RELATED APPLICATIONS

This application claims priority under 35 U.S.C. § 119 to Application NL 2028289, filed May 26, 2021, which is hereby incorporated by reference in its entirety.

The invention relates to a test kit to control an internal combustion engine for testing an internal combustion engine.

BACKGROUND OF THE INVENTION

The main function of an engine is to provide torque output. Realization of this function involves a lot of hardware and as such the function can fail or degrade over time.

In order to allow for a cost effective repair, (i.e. replacing the failed or degraded component rather than the entire engine), failed part identification capability is needed. As the engine becomes more complex and legal requirements on emissions become more stringent, demands on accurately identifying failed parts also increase.

In the art, it is known to measure the time taken in a cylinder test of an internal combustion engine when accelerating between a low engine speed and a higher engine speed. To this end a speed measurement device can be coupled to the engine to generate a series of pulses corresponding to an engine cycle; and the time periods between successive pulses can be measured. By varying the cylinders under test and evaluating the respective performance of the internal combustion engine a practical performance test is provided that indicates a health condition of individual cylinders. Such a method is eg known from U.S. Pat. No. 3,994,160.

For such tests, test kits have been developed that interface with an internal combustion engine, e.g. by adapting it to a central control unit, that has program logic to control the internal combustion unit. When connected, the test kit takes over engine control and tests can be carried out where the engine speed performance is measured in a condition of stand still, e.g. when the truck is in the repair shop and the engine provides no external torque.

To this end a test module is programmed to execute a sequence of individual cylinder tests, wherein the test module comprises computer code for measuring, in each cylinder test, a first engine performance value and further computer code for providing an amount of fuel to one cylinder under test to differ from an amount of fuel provided to the rest of the plurality of cylinders.

However, in some circumstances, it was found despite a negative assessment of the cylinder quality, and after extensive and time consuming repair activities, a cylinder engine did not prove to be faulty, despite a negative cylinder test. To this end it is an object to further improve the test kits for obtaining a test result wherein a cylinder under test is evaluated with more confidence, which may prevent loss of time and unnecessary replacement of cylinder parts.

SUMMARY OF THE INVENTION

In summary, the invention concerns a test kit comprising a testing program programmed to control an internal combustion engine for testing the internal combustion engine with the engine kept at a fixed load condition, provided with a test module programmed to execute a sequence of individual cylinder tests, wherein the test module comprises first computer code for measuring, in each cylinder test, a first engine performance value and further comprises second computer code for providing an amount of fuel to one cylinder under test to differ from an amount of fuel provided to the rest of the plurality of cylinders; and a further test module programmed to measure, in an idle period between subsequent individual cylinder tests of said sequence of individual cylinder tests, a second engine performance value; and said further test module comprising third computer code to discard at least some of the individual cylinder tests if the second engine performance measured by the further test module value passes a threshold.

The further test module offers a distinction between an increase in parasitic loss that may lower the tested cylinder acceleration likewise and which cannot be distinguished from a less performing cylinder due to a component failure. By providing the test kit with the further test module, a testing routine may be provided that is able to filter out test results that suffer from parasitic losses that may occur during a testing sequence, e.g. by for instance due to activation of air compressor, airco, coolant pump, etc. During the idling part in between accelerations the fuel-value required to idle the engine (which is then done on all cylinders) can be observed. If this deviates too much between accelerations; this will indicate a difference in parasitic losses; rendering the results unreliable.

This is advantageous since the test kit is not able to control all potential contributors to parasitic losses, and is therefore not able to fully prevent the above described issue. However, by detecting if a change in parasitic losses occurs the test can be aborted and the engineer may be informed that the test results are not reliable.

This test kit may significantly improve quality and accuracy assurance of a cylinder test used to identifying cylinder power contribution and as such improve accurate failed part identifying, thereby providing capability to the technician to replace the proper parts to bring the engine back into compliance. Accordingly a workshop engineer may now more reliably identify a cylinder at fault, since the test routine results are no longer compromised by faulty test conditions.

BRIEF DESCRIPTION OF THE DRAWINGS

The invention will be further elucidated in the figures.

DETAILED DESCRIPTION

Figure 1:
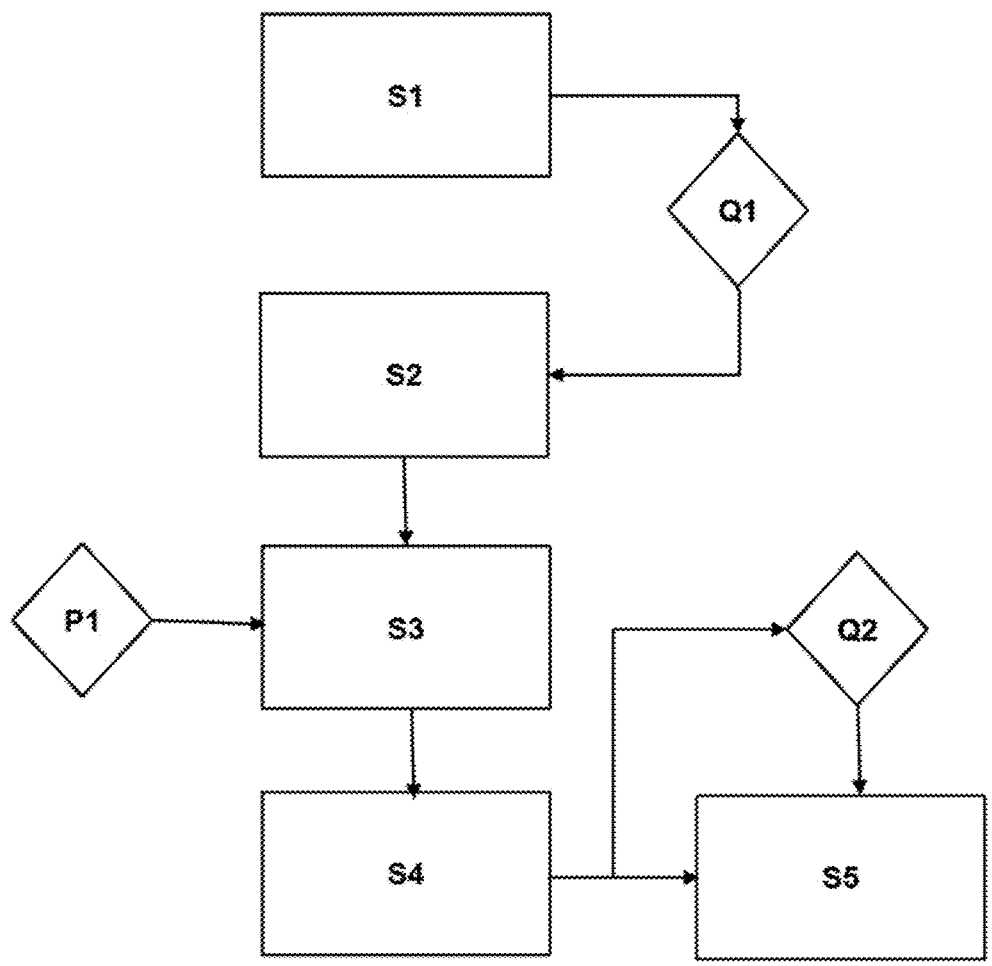
FIG. 1 provides a schematic representation of a first embodiment of an electric power module 100 for providing drive power in a truck.

Aspects of the invention pertain to an improved test kit for interfacing with an internal combustion engine. The test kit comprising a testing program programmed to control the internal combustion engine for testing the internal combustion engine. The testing program is provided with a test module programmed to execute a sequence of individual cylinder tests, wherein the test module comprises first computer code for measuring, in each cylinder test, a first engine performance value and further comprises second computer code for providing an amount of fuel to one cylinder under test to differ from an amount of fuel provided to the rest of the plurality of cylinders. A further test module is programmed to measure, in an idle period between subsequent individual cylinder tests of said sequence of individual cylinder tests, a second engine performance value. The further test module comprises third computer code to discard at least some of the individual cylinder tests if the second engine performance measured by the further test module value passes a threshold. The further test module may be programmed to keep the internal combustion engine at a fixed engine speed in the idle period, by varying the amount of fuel provided in a closed loop control and wherein the second performance value is the amount of fuel provided in the idle condition. Alternatively, the further test module may programmed to provide the internal combustion engine with a fixed amount of fuel; wherein the second engine performance value is a measured engine speed. While both alternatives are possible, the first alternative has a practical benefit that typically, in an internal combustion engine control unit already a feedback control is provided to vary the amount of fuel in a closed loop control with the engine speed. In an embodiment the second computer code provides a standard amount of fuel provided to the rest of the plurality of cylinders, and provides the cylinder under test with less fuel than the standard amount. In such condition the third computer code discards a cylinder test, if the first engine performance measured with the cylinder under test differs from the engine performance measured for any other cylinder test after completion of the sequence of individual cylinder tests. While the amount of fuel may vary, for obtaining clear results, it is advantageous if the amount of fuel provided to the cylinder under test is zero. While in principle, a fixed counter torque may be applied to the engine, e.g. by an electrical generator, preferably, the engine is kept at a load condition that keeps the motor running free without any external load.

While the invention primarily pertains to the said test kit, another aspect of the invention pertains to a method of testing an internal combustion engine comprising a plurality of cylinders, wherein each of the plurality of cylinders are tested individually with the engine kept at a fixed load condition, the method comprising the steps of executing a sequence of individual cylinder tests, wherein, for each individual cylinder test, a first engine performance value is measured in a condition that an amount of fuel provided to one cylinder under test differs relative to an amount of fuel provided to the rest of the plurality of cylinders;

wherein, in an idle period between subsequent individual cylinder tests of said sequence of individual cylinder tests, a second engine performance value is measured; and wherein at least some of the individual cylinder tests are discarded if the second engine performance value passes a threshold.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Turning to FIG. 1, a practical example is shown. In a first step S1, the test state will be rendered active. Next, when a series of test entry conditions Q1 are met (vehicle is in standstill, running idle, with no further appliances) the test becomes 'armed' in step S2.

In a further step S3, the test becomes active on an activation trigger P1, e.g. when an operator depresses and holds the accelerator pedal down. In this initial step S3 an idle condition is set up, wherein the engine settles to a consistent idle engine speed before the start of the test measurements in S4. In this phase, a sequence of individual cylinder tests is executed, wherein, for each individual cylinder test, an engine performance value is measured in a condition that an amount of fuel provided to one cylinder under test differs relative to an amount of fuel provided to the rest of the plurality of cylinders. A typical engine performance value is a completion time for completing a specified increase of engine speed from a first (idle) engine speed to a second speed, higher than idle condition. Another engine performance value may be the completion time to complete a predetermined number of revolutions. To this end, the testing program programmed to control the internal combustion engine is provided with a test module programmed to execute the sequence of individual cylinder tests wherein in each cylinder test the engine performance value is measured by means of computer code specifically programmed to that purpose and further comprises additional computer code for providing an amount of fuel to one cylinder under test to differ from an amount of fuel provided to the rest of the plurality of cylinders. E.g. in the test five cylinders can be fed with the same amount of fuel and the cylinder under test is fed with a lesser amount of fuel, which can, in particular, be zero fuel. To this end a 'negative quantity offset' can be added to the standard quantity provided to the cylinders.

During acceleration of for example cylinder #1 of six cylinders, five good cylinders will contribute with power and cylinder #1 will contribute with less power—because it is driven with a different amount of fuel, which may be zero. Since during acceleration tests of cylinders #2-#6, in case cylinder #1 is faulty, only four good cylinders will contribute with power it means that the completions times of cylinder tests #2-#6 will be less than the completion time of cylinder time #1, where five good cylinders contribute. This means that the completion time for the first cylinder will be shorter than the completion time for the other cylinders and this will take a shorter time to complete a fixed number of injections set by the test, which is a measure of averaged engine speed.

Thus, the completion time for acceleration number one being significantly shorter than that of remaining accelerations indicates to a workshop technician that cylinder 1 may be faulty. While a cylinder may be faulty by generating less power, there may occur conditions that the cylinder generates more than desired power, e.g. by a defective fuel inlet. When the faulty cylinder is omitted a 'standard' completion time will be achieved that is lower than the normal time. This is likewise implemented in the test program.

This test cycle is repeated for all cylinders, which are typically six cylinders, and after completion, the test state moves to a finished condition S5, where the engine is kept in idle state until the engine is halted by switching it off. During the test, if any of the test conditions occur, a stop command is generated by an test module Q2, which directly moves the computer stage from step S4 to S5, without completion of the test; while an indication is generated that the test is aborted. The test module Q2 to this end is programmed to measure, in an idle period between subsequent individual cylinder tests of said sequence of individual cylinder tests, a second engine performance value; and said further test module comprising third computer code to discard at least some of the individual cylinder tests if the second engine performance measured by the further test module value passes a threshold as further will be illustrated in subsequent figures.

Figure 2:
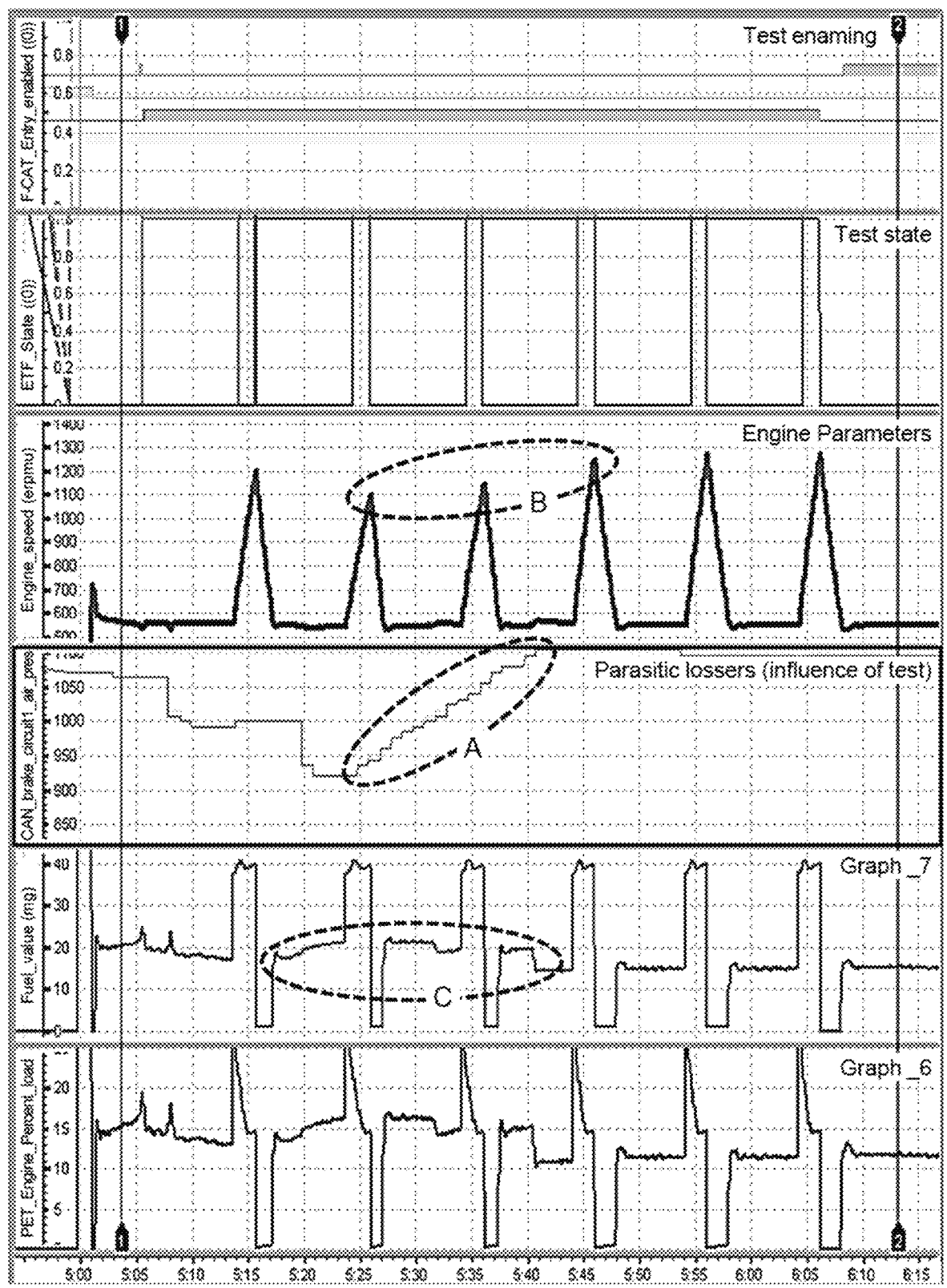
FIG. 2 shows an example of disturbance during cylinder acceleration function test.

In FIG. 2 an example of a disturbance during cylinder acceleration function test is shown. Reliability of engine test routines can be enhanced by choosing specific engine settings, like an engine speed that is higher than normal idle condition or a start condition for the test, e.g. a start engine speed that triggers the testing program to start the measurement of the engine performance value; or a closed EGR valve. The sensitivity of the component under test for disturbances is typically handled by getting rid of potential disturbances. A disturbance can be e.g. a cooling fan which is activated during a test, resulting in fluctuating engine torque and speed. When the engine load changes during the idle phase, a fuel injection quantity will be adjusted accordingly: load increase due to parasitic loss may result in an increase of fuel injection for the same engine idle speed. This detected fuel injection value, which can be regarded as a performance value, can be low pass filtered. By way of example line A shows the air pressure level of the vehicle system. In the displayed measurement no signal was available indicating the air compressor status. Therefore the air pressure level is used to see if the air compressor was active. At the moment that the air pressure level increases, the air compressor is activated, meaning that the engine has an increased amount of parasitic losses to drive the air compressor to generate the pressure, which leads to an increased fuel consumption.

The acceleration events are visible in the engine speed traces B. It can be seen at C that when the compressor becomes active an increased fuel quantity is required to maintain the same idle speed. Since the cylinder acceleration test algorithm uses a pre-determined fuel quantity for the acceleration, when more fueling is needed to maintain idle speed, it means less fuel excess is available for the acceleration, which results in a slower acceleration and as such more time is needed to achieve the pre-determined amount of engine revolutions, thereby falsely indicating an issue with the cylinder.

As a result the fuel quantity differs during test execution, which will impact the test results.

Figure 3:
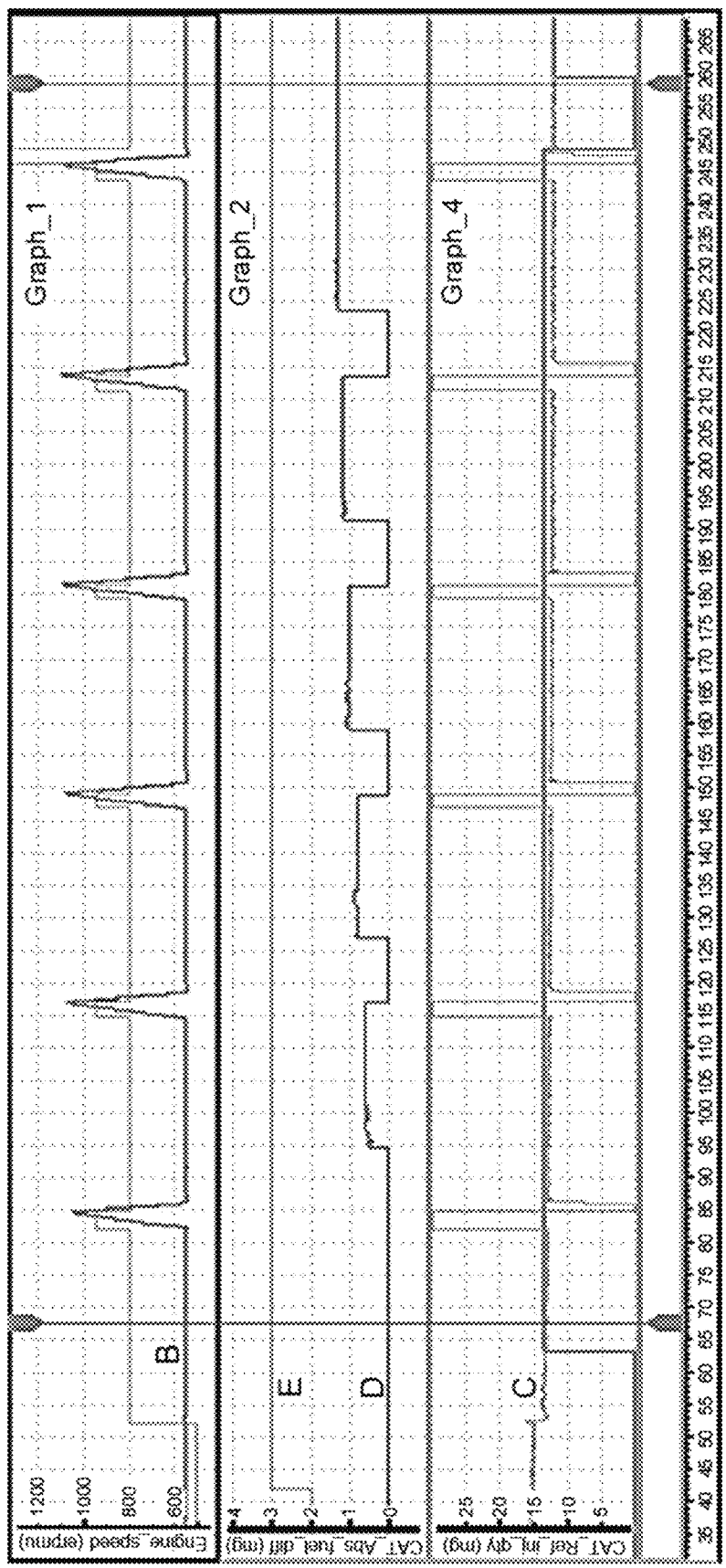
FIG. 3 shows a similar test trace as in FIG. 2.

In FIG. 3 a similar test trace is shown as in FIG. 2, with six engine performance tests shown by speed traces B and fuel dosage C. It is shown that a threshold E is provided and a signal D measures a difference of a fuel dosage compared to a reference value. In such condition, the performance value may be a difference value of an amount of fuel provided in the idle condition, relative to a reference value, and all cylinder tests are accepted because line D does not pass threshold line E.

It is thus believed that the operation and construction of the present invention will be apparent from the foregoing description and drawings appended thereto. For the purpose of clarity and a concise description features are described herein as part of the same or separate embodiments, however, it will be appreciated that the scope of the invention may include embodiments having combinations of all or some of the features described. The invention may identify changes in parasitic losses, to establish accuracy of test outcome, in order to ensure a technician will only act upon a valid test outcome. In addition, engine pre-conditioning may be used to minimize effect of components not directly related to the combustion or conversion of combustion to torque process (e.g. overrides on EGR valve and VGT). Furthermore, for result analysis, only specific parts of the acceleration may be used to filter out variability of acceleration initiation (i.e. the test can be commenced only after a certain waiting time or after a certain number of engine revolutions to achieve a steady state; typically the first series of combustion strokes often show higher variability than those afterwards, as some equilibrium in acceleration is achieved). The test may furthermore be combined with a compression test to provide further identification of potential root cause for low cylinder power contribution. The resultant processing method may include calculation of relative differences for each cylinder acceleration times from a median cylinder acceleration time, in order to minimize effect of a low performing cylinder on the result of other cylinder accelerations. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim. The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extent that structure, material, or acts are considered to be essential they are inexpressively indicated as such. Additions, deletions, and modifications within the purview of the skilled person may generally be made without departing from the scope of the invention, as determined by the claims.

The invention claimed is:

1. A test kit for interfacing with an internal combustion engine, said test kit comprising a testing program programmed to control the internal combustion engine for testing the internal combustion engine, said testing program provided with a test module programmed to execute a sequence of individual cylinder tests, wherein the test module comprises first computer code for measuring, in each cylinder test, a first engine performance value indicative of a health condition of an individual cylinder and further comprises second computer code for providing an amount of fuel to one cylinder under test to differ from an amount of fuel provided to the rest of the plurality of cylinders; and a further test module programmed to measure, in an idle period between subsequent individual cylinder tests of said sequence of individual cylinder tests, a second engine performance value; and said further test module comprising third computer code to discard at least some of the individual cylinder tests if the second engine performance value measured by the further test module passes a threshold.

2. The test kit according to claim 1, wherein the second computer code provides a standard amount of fuel to the rest of the plurality of cylinders, and provides the cylinder under test with less fuel than the standard amount; and wherein the third computer code discards a cylinder test, if the first engine performance value measured with the cylinder under test differs from the engine performance value measured for any other cylinder test after completion of the sequence of individual cylinder tests.

3. The test kit according to claim 1, wherein the engine is kept at a load condition that keeps the motor running free without an external load.

4. The test kit according to claim 1, wherein the third computer code discards all individual cylinder tests if the second engine performance value measured by the further test module value passes a threshold in any of the idle periods between subsequent individual cylinder tests.

5. The test kit according to claim 1, wherein the further test module is programmed to keep the internal combustion engine at a fixed engine speed in the idle period, by varying the amount of fuel provided in a closed loop control.

6. The test kit according to claim 5, wherein the second engine performance value is the amount of fuel provided in the idle period.

7. The test kit according to claim 5, wherein the second performance value is an amount of fuel provided in the idle period.

8. The test kit according to claim 1, wherein the further test module is programmed to provide the internal combustion engine with a fixed amount of fuel.

9. The test kit according to claim 8, wherein the second engine performance value is a measured engine speed.

10. The test kit according to claim 8, wherein the second engine performance value is a time measured to execute a predetermined number of engine revolutions.

11. The test kit according to claim 8, wherein the amount of fuel provided to the cylinder under test is zero.

12. A method of testing an internal combustion engine comprising a plurality of cylinders, wherein each of the plurality of cylinders are tested individually, the method comprising the steps of:
  executing a sequence of individual cylinder tests, wherein, for each individual cylinder test, a first engine performance value indicative of a health condition of an individual cylinder is measured in a condition that an amount of fuel provided to one cylinder under test differs relative to an amount of fuel provided to the rest of the plurality of cylinders;
  wherein, in an idle period between subsequent individual cylinder tests of said sequence of individual cylinder tests, a second engine performance value is measured; and
  wherein at least some of the individual cylinder tests are discarded if the second engine performance value passes a threshold.

* * * * *